Patented Nov. 18, 1947

2,430,993

UNITED STATES PATENT OFFICE 2,430,993

PLASTICIZING POLYISOBUTYLENE UTILIZING BENZOYL PEROXIDE

John Rehner, Jr., Westfield, N. J., and Paul J. Flory, Cuyahoga Falls, Ohio, assignors to Standard Oil Development Company, a corporation of Delaware No Drawing. Application March 3, 1944, Serial No. 524,914

2 Claims. (Cl. 260—36)

The present invention relates to synthetic rubber-like substances and more particularly relates to means for plasticizing high molecular weight linear polymers of mono-olefins.

The linear polymeric hydrocarbon compounds of mono-olefins may be broadly termed polyalkenes. This broad class includes analogous polymers: polyethene, polypropene, polybutenes and polypentenes, all of which are similarly stable, susceptible to similar oxidation treatment and characteristically substantially saturated linear hydrocarbon polymers, but of these polyalkenes, the preferred types are branched chain linear compounds, which are formed particularly from an iso-mono-olefin, for example, especially isobutene. The preferred branched linear polymers have a structure corresponding to a long chain of saturated carbon atoms containing a number of short alkyl side chains such as methyl or butyl groups.

The polybutenes may be prepared commercially from a mixture of isobutene and varying percentages of normal butenes, but are derived essentially from the isobutene. It will be understood that the preparation of the high molecular weight polymeric hydrocarbon compounds does not form a part of this invention, and various known methods for producing the hydrocarbon polymers may be used. For example, a polybutene polymer having molecular weight range from 800 to 250,000 or more is obtained by contacting the isobutene reactant material with boron fluoride or other Friedel-Crafts catalyst at a temperature range from −10° to −100° C. or lower, the molecular weight depending upon the purity of the reactant, the polymerization temperature and other known controlling conditions.

The molecular weight of these polymers is conveniently determined by a measurement of the intrinsic viscosity of the polymer in solution, preferably in diisobutylene at 20° C. as outlined by E. O. Kraemer in "Industrial and Engineering Chemistry," volume 30, page 1200 (1938). The preferred form of polymer has an intrinsic viscosity preferably within the range between 0.6 and about 5. This viscosity range, as shown by the work of Paul J. Flory, reported in the Journal of the American Chemical Society, volume 65, page 372 (1943), corresponds to an actual molecular weight between 120,000 and 3,000,000 (this being equivalent to the Staudinger number, or "molecular weight" by the Staudinger Method, of approximately 20,000 to 150,000). The preferred range of intrinsic viscosities lies between about 1 and 2.5, corresponding to actual molecular weights of 400,000 to 1,100,000, and corresponding to Staudinger numbers between about 31,000 and 78,000.

The relationship between the intrinsic viscosity of a polymer in solution in diisobutylene at 20° C., the Staudinger number and the viscosity average molecular weight is well shown in the following table:

| Intrinsic Viscosity in Diisobutylene at 20° C. | Staudinger Number$\times 10^{-3}$ | Viscosity Average Molecular Weight$\times 10^{-3}$ |
|---|---|---|
| 0.20 | 6.2 | 21.2 |
| .40 | 12.5 | 63 |
| .60 | 18.7 | 120 |
| .80 | 24.9 | 185 |
| 1.00 | 31.2 | 264 |
| 1.25 | 39.0 | 373 |
| 1.50 | 46.8 | 495 |
| 1.75 | 54.7 | 630 |
| 2.00 | 62.5 | 775 |
| 2.5 | 78.1 | 1,100 |
| 3.0 | 93.7 | 1,460 |
| 3.5 | 109 | 1,860 |
| 4.0 | 125 | 2,300 |
| 5.0 | 156 | 3,250 |

The "intrinsic viscosity" is given by the equation:

$$(1n \eta r)/c \to 0$$

where $\eta r$ is the relative viscosity (ratio of viscosity of solution to that of the solvent) of a dilute solution of the polymer in diisobutylene at 20° C., and $c$ is the concentration of polymer in gms. per 100 cc. The concentration should be such that $(\eta)$ does not exceed about 1.4. (See E. O. Kraemer, Ind. Eng. Chem. 30, 1200 (1938) for the definition of the term "intrinsic viscosity" designated by $(\eta)$.) Staudinger numbers, formerly referred to as "molecular weights," are obtained by multiplying $(\eta)$ by about $3.12 \times 10^4$.

The high moleculiar weight polymers described above have proved to be unsuitable for certain uses, particularly when subjected to shear, due to their molecular breakdown.

According to this invention it has been found that by milling these high molecular weight isobutylene polymers with organic peroxides, especially at elevated temperatures, it is possible to produce a degraded polymer of narrower molecular weight range than can be obtained by direct synthesis and are therefore less susceptible to breakdown in use. These modified polymers are preferably produced by milling at hot roll temperatures in the neighborhood of 290° F. for about 15 minutes in the presence of 0.1 to 10% of an organic peroxide such as benzoyl peroxide. The product may be modified by altering the time and temperature of milling, the plasticity of the original polymer and the percentage and kind of peroxide used. For this purpose, benzoyl peroxide is highly advantageous but many other organic peroxides such as tetralin peroxide, ascaridole and urea peroxide may be used. Organic ozonides and nitroso-aromatic compounds such as oleic acid ozonide and nitrosobenzene are also suitable. The following table is indicative of the results obtained by treating polyisobutylene with benzoyl peroxide in this manner.

TABLE I

| Polymer Sample No. | Added Benzoyl Peroxide Per cent | Mixture Milled at 290° F.+ for— | Intrinsic Viscosity of Product | Staudinger Value of Product |
|---|---|---|---|---|
| | | *Minutes* | | |
| 20 | None | 10 | 1.260 | 39,500 |
| 21 | 0.1 | 10 | 0.852 | 26,500 |
| 22 | 0.2 | 10 | 0.692 | 21,500 |
| 23 | 0.3 | 10 | 0.630 | 19,500 |
| 24 | 0.5 | 10 | 0.468 | 14,500 |
| 25 | 0.75 | 10 | 0.409 | 12,500 |
| 26 | 1.0 | 10 | 0.363 | 11,000 |
| 27 | 1.25 | 10 | 0.346 | 10,500 |
| 28 | 1.5 | 10 | 0.318 | 10,000 |
| 29 | None | 20 | 0.990 | 31,000 |
| 30 | 0.1 | 20 | 0.806 | 25,000 |
| 31 | 0.2 | 20 | 0.625 | 19,500 |
| 32 | 0.3 | 20 | 0.540 | 17,000 |
| 33 | 0.5 | 20 | 0.422 | 13,000 |
| 34 | 0.75 | 20 | 0.410 | 12,500 |
| 35 | 1.0 | 20 | 0.343 | 10,500 |
| 36 | 1.25 | 20 | 0.334 | 10,300 |
| 37 | 1.5 | 20 | 0.305 | 9,500 |

It has been found that isobutylene polymer chains having molecular weights of about 60,000 or less do not further break down in oil under mechanical shear stresses. From the following table it is shown that ordinary high molecular weight polymers contain 35–90% of material above this critical limit from which it is evident that such a polymer will experience a large amount of shear degradation. The same table shows that the polymers modified by milling with benzoyl peroxide have much lower percentages of components with molecular weights above this limit, with the result that these polymers would show comparatively little molecular degradation during use.

A very important use of the modified polymers arises from the fact that they have a certain desirable lubricating character and at the same time have the property of improving viscosity characteristics of and thickening viscous oils. These modified polymers form stable blends with hydrocarbon lubricating oils and effect substantial improvement in the viscosity characteristics of such blends when added in small amounts. Thus by adding from about 1% to about 10% of the modified polymer to a hydrocarbon lubricating oil the viscosity of the blend is substantially increased over a lower temperature range to thereby flatten the temperature viscosity curve of the mixture. The upper limit of the amount of oxidized polymer added varies with the nature of the addition and with the other ingredients blended. Up to about 20% to 30% of the oxidized polymer may be added with very good results. Additions of larger amounts may lead to a viscosity that is excessive for practical purposes.

The following examples will further illustrate the nature of this invention with respect to the utilization of the modified polymer as a blending agent in improving the viscosity characteristics of a lubricating oil with respect to molecular stability.

Certain percentages of the modified polymer products formed in accordance with the given described examples were added to samples of a hydrocarbon lubricating oil and the blends thus formed, as well as the blends of oil with the unmodified polymer, used as a blank, were subjected to the shearing action of a gear type pump such as that manufactured by the Zenith Products Company, in which the oil is forced through a steel capillary tube about 4 cm. in length and .06 cm. in radius, at a pressure of 600 lbs./sq. in. The apparatus is arranged in such a manner that the temperature can be controlled, and the oil after passage through the capillary may be returned and subjected to any desired number of repeated passes through the capillary.

TABLE II

*Fractionation data on chemically degraded polybutene*

| Polymer | Original Average Molecular Weight | Weight Per Cent of Polymer in Various Fractions | | |
|---|---|---|---|---|
| | | Low Fraction | Middle Fraction | High Fraction |
| Original | 850,000 | 10.3% below 50,000 (mol. wt.) | 5.7% between 50,000 and 90,000 (mol. wt.) | 84.0% above 90,000 (mol. wt.). |
| A | 72,000 | 55.1% below 50,000 (mol. wt.) | 31.2% between 50,000 and 90,000 (mol. wt.) | 13.7% above 90,000 (mol. wt.). |
| B | 58,000 | 43.2% below 40,000 (mol. wt.) | 41.6% between 40,000 and 80,000 (mol. wt.) | 15.2% above 80,000 (mol. wt.). |
| C | 49,000 | 39.4% below 30,000 (mol. wt.) | 40.4% between 30,000 and 70,000 (mol. wt.) | 20.2% above 70,000 (mol. wt.). |

A = Milled for 5 minutes at 250–280° F. in the presence of 1% benzoyl peroxide.
B = Milled for 10 minutes at 250°–280° F. in the presence of 1% benzoyl peroxide.
C = Milled for 5 minutes at 250°–280° F. in the presence of 1.5% benzoyl peroxide.

TABLE III

*Homogenization of polybutene by premilling*

| | Wt., Per Cent | Mol. Wt. | Original Inspections of Blends | | | | Per Cent Loss in Viscosity/100° F. in Zenith Pump after Indicated Passes | | | Viscosity Temperature Slope −40°F to 210° F. after 150 Passes in Zenith Pump |
|---|---|---|---|---|---|---|---|---|---|---|
| | | | Centistokes Viscosity | | | Viscosity Temperature Slopes −40° to 210° F. | | | | |
| | | | At 210° F. | At 100° F. | At −40° F. | | 50 | 100 | 150 | |
| Untreated polymerized isobutylene | 8.0 | 67,000 | 1093.0 | 4361.0 | | | (¹) | (¹) | (¹) | |
| Same after 200 Cycles in Zenith Pumps at −20 to −70° F. and 600 lbs./sq. in. | 6.2 | 16,200 | 8.135 | 26.33 | 1,550 | 0.516 | 7.6 | 12.3 | 16.0 | 0.537 |
| Same after 5 Minutes on Rubber Mill at 250–275° F. using 1% of Benzoyl-peroxide Catalyst | 7.15 | 13,500 | 7.935 | 25.55 | 1,421 | 0.517 | 15.0 | 20.4 | 24.2 | 0.553 |
| Same after 10 min. on Rubber Mill at 250 to 275° F. using 1% of Benzoylperoxide Catalyst | 8.0 | 11,700 | 8.048 | 26.19 | 1,542 | 0.521 | 11.8 | 16.1 | 18.4 | 0.548 |
| Same after 5 Min. on Rubber Mill at 250 to 275° F. using 1.5% of Benzoylperoxide Cat | 8.8 | 10,500 | 7.640 | 25.19 | 1,548 | 0.532 | 5.8 | 9.7 | 12.7 | 0.548 |

¹ 43.0 cs./100° F. after 200 cycles in Zenith, 12.6 cs./210° F. after 200 cycles in Zenith.

It is thus evident from the foregoing table that 30 to 50% improvement in shear stability over the untreated polymer can be effected by masticating the polymer at 250–275° F. in the presence of benzoyl peroxide.

The nature and objects of the present invention having thus been set forth and specific embodiments of the same given, what is claimed as new and useful and desired to be secured by Letters Patent is:

1. The method of increasing the plasticity of a normally solid high molecular weight homopolymer of isobutylene which comprises adding to said polymer 0.1% to 10% of benzoyl peroxide and incorporating the said benzoyl peroxide into said polymer by mechanically working the mixture at an elevated temperature of 250° F. to 290° F. for 5 to 20 minutes.

2. The method of increasing the plasticity of a normally solid high molecular weight homopolymer of isobutylene which comprises milling the same at a hot roll temperature of 250° F. to 290° F. for 5 to 20 minutes in the presence of 0.1 to 10% of benzoyl peroxide.

JOHN REHNER, JR.
PAUL J. FLORY.

REFERENCES CITED

The following references are of record in the file of this patent:

UNITED STATES PATENTS

| Number | Name | Date |
|---|---|---|
| 2,122,826 | Van Peski, (1) | July 5, 1938 |
| 2,138,895 | Wiezevich | Dec. 6, 1938 |
| 2,180,082 | Mueller-Cunradi | Nov. 14, 1938 |
| 2,181,158 | Sparks (1) | Nov. 28, 1939 |
| 2,263,654 | Sparks (2) | Nov. 25, 1941 |
| 2,305,007 | Hopff et al. | Dec. 15, 1942 |
| 2,317,385 | Koch et al. | Apr. 27, 1943 |
| 2,356,128 | Thomas et al. | Aug. 22, 1944 |
| 2,235,149 | Gerke | Mar. 18, 1941 |
| 2,316,371 | Strother | Apr. 13, 1943 |
| 2,326,595 | Young | Aug. 10, 1945 |
| 2,327,975 | Zaucker | Aug. 24, 1943 |
| 2,334,996 | Davis | Nov. 23, 1943 |
| 2,016,403 | Tuley | Aug. 11, 1932 |

FOREIGN PATENTS

| Number | Country | Date |
|---|---|---|
| 538,983 | Great Britain | Aug. 25, 1941 |
| 698,614 | Germany | Nov. 14, 1940 |

OTHER REFERENCES

Durrans, Solvents, London 1938, pages 89 and 90 (4th edition).